United States Patent
Zhu et al.

(10) Patent No.: US 12,226,935 B2
(45) Date of Patent: Feb. 18, 2025

(54) SCREW PUMP SCREW ROD RUBBER LINING MOULD AND USE METHOD THEREOF

(71) Applicant: ZHEJIANG OCEAN UNIVERSITY, Zhoushan (CN)

(72) Inventors: Baikang Zhu, Zhoushan (CN); Hengcong Tao, Zhoushan (CN); Le Zhang, Zhoushan (CN); Bo Ding, Zhoushan (CN)

(73) Assignee: ZHEJIANG OCEAN UNIVERSITY, Zhoushan (CN)

( * ) Notice: Subject to any disclaimer, the term of this patent is extended or adjusted under 35 U.S.C. 154(b) by 0 days.

(21) Appl. No.: 17/642,707

(22) PCT Filed: Jan. 6, 2022

(86) PCT No.: PCT/CN2022/070442
§ 371 (c)(1),
(2) Date: May 12, 2022

(87) PCT Pub. No.: WO2022/096035
PCT Pub. Date: May 12, 2022

(65) Prior Publication Data
US 2024/0042654 A1    Feb. 8, 2024

(30) Foreign Application Priority Data
Nov. 6, 2020 (CN) .......................... 202011231930.X

(51) Int. Cl.
*B29C 45/00* (2006.01)
*B29C 33/38* (2006.01)

(52) U.S. Cl.
CPC .............................. *B29C 33/3842* (2013.01)

(58) Field of Classification Search
CPC .......... C22C 30/00; C22C 29/00; C22C 29/04; B29C 45/00; B22F 3/225
See application file for complete search history.

(56) References Cited

U.S. PATENT DOCUMENTS 6,417,256 B1    7/2002    Eckel et al.
6,634,781 B2   10/2003    Bowens et al.
(Continued)

FOREIGN PATENT DOCUMENTS

CN       1271706 A    11/2000
CN     105773882 A     7/2016
(Continued)

OTHER PUBLICATIONS

English translation of CN-107794430-A (Year: 2018).*
Zhu et al. (CN 105922502 A, hereinafter Zhu) english translation (Year: 2016).*

*Primary Examiner* — Seyed Masoud Malekzadeh
*Assistant Examiner* — John W Hatch
(74) *Attorney, Agent, or Firm* — True Shepherd LLC; Andrew C. Cheng

(57) ABSTRACT

A preparation method of a screw pump screw pump screw rod rubber lining mould includes: mixing a high strength wear-resistant material with a binder to obtain a mixed slurry; injecting the mixed slurry into a female die for solidification and taking out to form a screw rod rubber lining mould preform; drying and sintering the screw rod rubber lining mould preform to obtain a screw rod rubber lining mould; immersing the screw rod rubber lining mould into a surface treatment liquid for surface heat treatment to form a wear-resistant layer, and cooling down to obtain a final mould. The high strength wear-resistant material is prepared by using a $ZnFe_2O_4$ nano-particle reinforced $Ti(C, N)$-based metal ceramic composite material; the surface treatment liquid includes an aluminum borosilicate whisker/

(Continued)

polyimide composite material solution; the high strength wear-resistant material having good strength, good hardness, good fracture toughness, and good wear resistance is prepared and applied.

3 Claims, 11 Drawing Sheets

(56) References Cited

U.S. PATENT DOCUMENTS

| | | |
|---|---|---|
| 10,240,588 B2 | 3/2019 | Reukers |
| 2017/0234076 A1* | 8/2017 | Cook, III .............. E21B 10/602 175/425 |

FOREIGN PATENT DOCUMENTS

| | | | | |
|---|---|---|---|---|
| CN | 105922502 A | * | 9/2016 | ............. B29C 45/14 |
| CN | 107794430 A | * | 3/2018 | ............. C22C 1/051 |
| CN | 111807824 A | | 10/2020 | |

* cited by examiner

SCREW PUMP SCREW ROD RUBBER LINING MOULD AND USE METHOD THEREOF

TECHNICAL FIELD

The present disclosure relates to the field of screw pump screw rod rubber lining technologies, and in particular to a screw pump screw rod rubber lining mould and a use method thereof.

BACKGROUND

A screw pump usually works relying on rotational movement of mutually-engaged screw rods. During a rotational movement of the screw rods, materials will produce friction with the screw rods and the inner walls of the pump body, so that working surfaces between the screw rod and the pump body inner walls/screw rod will be gradually worn out, resulting in gradual reduction of diameter of the screw rod and gradual increase of diameter of inner hole of the pump body. In this case, a gap between the screw rod and another screw rod, and between the screw rod and the pump body inner wall will be gradually increased along with gradual wear, which increases a leakage flow at the time of advancing material. At the same time, when the pump screw conveys a liquid with high content of impurities, the screw rod may be easily blocked by some harder impurities, thus lowering the working efficiency. Therefore, it is very important to develop a new screw pump to improve a wear-resistant capability of a screw rod and increase a sealing performance and a medium carrying capability of the screw rod. It is known that the wear-resistant performance of the screw pump may be increased to some extent by lining rubber on the screw rods. Therefore, how to complete a rubber lining on a screw rod with high quality becomes a hot spot now.

At present, in order to prepare a high quality screw rod rubber lining, it is a key step to develop a screw pump screw rod rubber lining mould. In the prior art, Chinese invention patent with publication number CN 109049532 A discloses a screw pump screw rod rubber lining mould and a use method thereof, including an intermediate die assembly, a bottom die, and a mould core, wherein the intermediate die assembly includes a first intermediate die, a plurality of second intermediate dies, and a third intermediate die, a first cavity is disposed at the center of the first intermediate die, a second cavity is disposed at the center of the second intermediate die, and a third cavity is disposed at the center of the third intermediate die; when the mould is heated or injected with rubber, gap between various parts of the mould will be increased. By use of a vertical pressure of an injection moulding machine, various parts of the mould can be closely attached each other, avoiding occurrence of gaps.

SUMMARY

The present disclosure aims to provide a high-strength wear-resistant material with high strength, high hardness, high fracture toughness and good wear-resistant performance.

In order to achieve the above purpose, the present disclosure employs the following technical solution:

A high strength wear-resistant material is prepared with a $ZnFe_2O_4$ nano-particle-reinforced Ti(C,N)-based metal ceramic composite material.

Preferably, the high strength wear-resistant material further includes a metal binder phase and a carbide.

Further preferably, the high strength wear-resistant material includes, by weight part, 5~25 parts of $ZnFe_2O_4$ nanoparticles, 20~50 parts of Ti(C,N)-based metal-ceramic composite material, 10-20 parts of metal binder phase, and 5-15 parts of carbide.

In the present disclosure, the high strength wear-resistant material is prepared by use of the $ZnFe_2O_4$ nano-particle-reinforced Ti(C,N)-based metal ceramic composite material because ceramic nano-particle reinforcement can combine with metal ceramic matrix, various ingredients of the material can achieve synergic effect in high temperature treatment, the $ZnFe_2O_4$ nano-particle with face-centered cubic crystal structure is refined to regulate physicochemical properties of the composite material, so that the comprehensive performance of the material is significantly improved and the composite material has high strength, high hardness, high fracture toughness, and good wear-resistant performance. At the same time, the metal binder phase and carbide are added to the composite material to enable various ingredients of the composite material to be mutually connected and interacted, thereby effectively improving the physical and mechanical properties of the composite material.

Further preferably, the metal binder phase is a mixed powder of Mo powder, Ni powder and Cr powder, where a weight ratio of Mo powder, Ni powder and Cr powder is 1:1:1~3.

Further preferably, the carbide is a mixed carbide of tungsten carbide and silicon carbide, where a weight ratio of tungsten carbide to silicon carbide is 2~4:1.

Preferably, a preparation method of a $ZnFe_2O_4$ nano-particle is as follows:

Based on weight part, 0.5~1.5 parts of zinc nitrate hexahydrate and 1.3~2 parts of ferrous sulfate heptahydrate are weighed and dissolved in de-ionized water to enable a concentration of zinc nitrate hexahydrate to be 1.5~2.5 g/mL, and then stirred to form a homogeneous metal ion precursor solution; then, a mixed solution of 0.2~0.4 parts of fluorinated ammonia and 0.3~0.8 parts of urea is added to the above metal ion precursor solution and then stirred for 10~25 min and then transferred to a reaction kettle, and subjected to hydrothermal reaction for 8-11 h at the temperature of 180~220° C. and then cooled down to room temperature after completion of the reaction, the obtained precipitate is centrifuged and washed with ethanol and then placed in a drying oven, and finally placed in a muffle furnace and heated to 400~500° C. for calcination from room temperature at the rate of 1~3° C./min, and held for 1~2 h, cooled down and ground to obtain a $ZnFe_2O_4$ nano-particle.

The present disclosure further provides use of the above high-strength wear-resistant material in a mould. The application of the above high-strength wear-resistant material to the mould enables the mould to have high strength, high hardness and good wear-resistant performance, good corrosion resistance, and good high temperature oxidation resistance.

Preferably, the mould is a screw rod rubber lining mould.

Another object of the present disclosure is to provide a surface treatment liquid capable of forming a good performance wear-resistant layer with a surface of a mould.

The surface treatment liquid includes an aluminum borosilicate whisker/polyimide composite material solution.

the effective ingredient, the aluminum borosilicate whisker/polyimide composite material, of the surface treatment liquid in the present disclosure, performs composite reaction with other ingredients in the mould during a surface heat treatment of the mould, so that one wear-resistant protective layer is formed on the surface of the mould so as to reinforce wear resistance. In this way, the strength, hardness, and the wear resistance of the mould are further improved and at the same time, the mould has good corrosion resistance and high temperature oxidation resistance.

Preferably, a preparation method of the aluminum borosilicate whisker/polyimide composite material is as follows:

Based on weight part, 1~5 parts of aluminum borosilicate whisker is added to 45~65 parts of polyimide solution ultrasonically dispersed by ethanol for reaction of 0.5~1.5 h at the temperature of 120~150° C., and after reaction, placed in a drying oven for 7~10 h and cooled down to give the aluminum borosilicate whisker/polyimide composite material.

Preferably, a mass fraction of the aluminum borosilicate whisker/polyimide composite material solution is 15~30 wt %.

The present disclosure further provides use of a surface treatment liquid in a surface heat treatment of a mould.

Preferably, use of the surface treatment liquid in forming one wear-resistant protective layer on a surface of the mould is provided.

Preferably, use of the surface treatment liquid in reinforcing the wear resistance of the mould is provided.

Preferably, use of the surface treatment liquid in reinforcing the high-temperature oxidation resistance of the mould is provided.

Preferably, the mould is a screw rod rubber lining mould.

Preferably, a mass fraction of the aluminum borosilicate whisker/polyimide composite material solution is 15~30 wt %.

Another object of the present disclosure is to prepare a screw pump screw rod rubber lining mould with high strength, high hardness, good wear resistance, good corrosion resistance and good high temperature oxidation resistance.

In order to achieve the above object, the present disclosure employs the following technical solution:

A screw pump screw rod rubber lining mould is made of a high strength wear-resistance material.

The screw pump screw rod rubber lining mould of the present disclosure uses the high strength wear-resistance material prepared by use of $ZnFe_2O_4$ nano-particle reinforced Ti(C,N)-based metal ceramic composite material to have high strength, high hardness, good wear resistance, good corrosion resistance and good high temperature oxidation resistance.

The present disclosure further provides a preparation method of a screw pump screw rod rubber lining mould, including the following steps:

mixing high-strength wear-resistant material with a binder to obtain a mixed slurry;

injecting the mixed slurry into a female die for solidification and taking out to form a screw rod rubber lining mould preform;

drying and sintering the screw rod rubber lining mould prefrom to obtain a screw rod rubber lining mould;

immersing the screw rod rubber lining mould into a surface treatment liquid for surface heat treatment to form a wear-resistant layer, and cooling down to obtain a final mould.

Preferably, by weight part, 50~90 parts of high strength wear-resistant material and 6~15 parts of binder are uniformly mixed to obtain a slurry to enable them be more easily poured into the mould.

Preferably, the binder is one of phenolic resin, urea resin and tetraethyl orthosilicate.

Preferably, the screw rod rubber lining mould prefrom is dried for 1~3 h at the temperature of 60~70° C. with the sintering curve as follows: heating to 450~550° C. from room temperature at the heating rate of 0.5~2.5° C./min and holding for 1~2 h and then heating to 1150~1300° C. at the heating rate of 3~5° C./min.

Preferably, the ingredient of the surface treatment liquid includes the aluminum borosilicate whisker/polyimide composite material solution.

In the present disclosure, surface heat treatment is performed for the screw pump screw rod rubber lining mould by using the aluminum borosilicate whisker/polyimide composite material, so that the aluminum borosilicate whisker/polyimide composite material performs composite reaction with other ingredients in the mould, so as to form one wear-resistant protective layer on the surface of the mould, thereby reinforcing the wear resistance. Further, the strength, hardness, the wear resistance and corrosion resistance of the mould are further improved and at the same time, the mould has high temperature oxidation resistance.

More preferably, a preparation method of the above aluminum borosilicate whisker/polyimide composite material is as follows:

by weight part, 1~5 parts of aluminum borosilicate whisker is added to 45~65 parts of polyimide solution ultrasonically dispersed by ethanol for reaction of 0.5~1.5 h at the temperature of 120~150° C., and after reaction, placed in a drying oven for 7~10 h and cooled down to give the aluminum borosilicate whisker/polyimide composite material.

More preferably, a mass fraction of the aluminum borosilicate whisker/polyimide composite material solution is 15~30 wt %.

Preferably, the screw rod rubber lining mould is immersed in the surface treatment liquid with immersion time 10~20 min, surface heat treatment temperature 100~150° C., treatment time 30~50 min to form a wear-resistance layer of 6~12 μm thick.

Another object of the present disclosure is to provide a surface treatment liquid capable of forming a good performance wear-resistant layer with a surface of a mould.

The ingredient of the surface treatment liquid includes an aluminum borosilicate whisker/polyimide composite material solution with a mass fraction of 5~30 wt %.

The effective ingredient, the aluminum borosilicate whisker/polyimide composite material, of the surface treatment liquid in the present disclosure, performs composite reaction with other ingredients in the mould during a surface heat treatment of the mould, so that one wear-resistant protective layer is formed on the surface of the mould so as to reinforce wear resistance. In this way, the strength, hardness, and the wear resistance of the mould are further improved and at the same time, the mould has good corrosion resistance and high temperature oxidation resistance.

The present disclosure further provides a use method of a screw pump screw rod rubber lining mould, including performing external surface treatment, high temperature deoiling, sand blasting, and washing for a screw rod and applying binder; then, placing the screw rod in the above screw pump screw rod rubber lining mould, injecting rubber, and vulcanizing to obtain a screw pump screw rod rubber lining; where the specific experimental conditions are prior art and operation is performed according to normal conditions.

In order to further improve strength, hardness, wear resistance, corrosion resistance and high temperature oxidation resistance of the screw pump screw rod rubber lining mould, the preferred measures employed further include the followings:

When surface treatment is performed for the mould, the mould is immersed in a composite solution containing aluminum borosilicate whisker/polyimide composite material and sodium tripolyphosphate for surface heat treatment, where a mass fraction of the aluminum borosilicate whisker/polyimide composite material to sodium tripolyphosphate is 3~5:1. After surface treatment is performed with the composite solution, the wear resistance, corrosion resistance and high temperature resistance of the mould are further improved for the following possible reasons: the aluminum borosilicate whisker/polyimide composite material in the composite solution can perform physical crosslinking with sodium tripolyphosphate so that after heat treatment, a firmer protective layer is formed on the surface of the mould, thereby further improving the strength, hardness, wear resistance, corrosion resistance and high temperature oxidation resistance of the mould.

Due to adoption of the $ZnFe_2O_4$ nano-particle reinforced Ti(C,N)-based metal ceramic composite material, the present disclosure has the following beneficial effects: the ceramic nano-particle reinforcement in the high strength wear-resistant material of the present disclosure can combine with metal ceramic matrix, various ingredients of the material can achieve synergic effect in high temperature treatment, and the comprehensive performance of the material is significantly improved so that the composite material has high strength, hardness, fracture toughness, and good wear resistance; at the same time, the metal binder phase and carbide are added to the composite material to enable various ingredients of the composite material to be mutually connected and interacted, thereby effectively improving the physical and mechanical properties of the composite material. Therefore, the present disclosure is a high strength wear-resistant material having good strength, good hardness, good fracture toughness, and good wear resistance.

In the present disclosure, the screw pump screw rod rubber lining mould is prepared using the high-strength wear-resistant material prepared by use of the $ZnFe_2O_4$ nano-particle reinforced Ti(C,N)-based metal ceramic composite material and further subjected to surface treatment, and therefore the present disclosure has the following beneficial effects: the screw pump screw rod rubber lining mould in the present disclosure has the performance of the high strength wear-resistant material, and further, the aluminum borosilicate whisker/polyimide composite material performs composite reaction with other ingredients in the mould, so that one wear-resistant protective layer is formed on the surface of the mould so as to reinforce wear resistance. In this way, the strength, hardness, and the wear resistance of the mould are further improved and at the same time, the mould has good corrosion resistance and high temperature oxidation resistance.

Therefore, the present disclosure is a screw pump screw rod rubber lining mould having good strength, good hardness, good fracture toughness, good corrosion resistance and good wear resistance.

BRIEF DESCRIPTIONS OF THE DRAWINGS

DETAILED DESCRIPTIONS OF EMBODIMENTS

Figure 1:
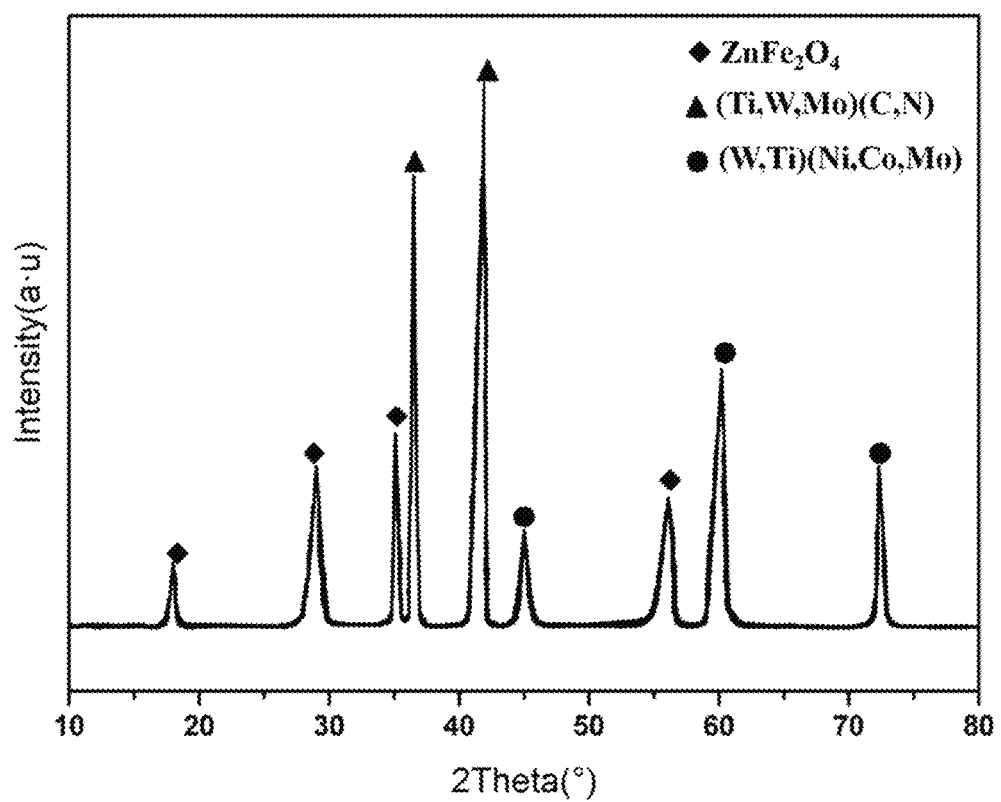
FIG. 1 is an XDR diagram of a high strength wear-resistant material according to a second example of the present disclosure.

The technical solution of the present disclosure will be further described below in combination with the specific examples and accompanying drawings.

In some examples, a preparation method of a $ZnFe_2O_4$ nano-particle is as follows:

Based on weight part, 0.8 parts of zinc nitrate hexahydrate and 1.5 parts of ferrous sulfate heptahydrate are weighed and dissolved in de-ionized water to enable a concentration of zinc nitrate hexahydrate to be 2.2 g/mL, and then stirred to form a homogeneous metal ion precursor solution; then, a mixed solution of 0.25 parts of fluorinated ammonia and 0.4 parts of urea is added to the above metal ion precursor solution and then stirred for 15 min and then transferred to a reaction kettle, and subjected to hydrothermal reaction at the temperature of 210° C. for 9 h and then cooled down to room temperature after completion of the reaction, the obtained precipitate is centrifuged and washed with ethanol and then placed in a drying oven of 80° C. for 2~5 h, and finally placed in a muffle furnace and heated to 500° C. for calcination from room temperature at the rate of 1° C./min, and held for 2 h, cooled down and ground to obtain the $ZnFe_2O_4$ nano-particle.

In some examples, a preparation method of a high-strength wear-resistant material is as follows:

Based on weight part, 20~50 parts of Ti(C,N), 10~20 parts of a mixed powder of Mo powder, Ni powder and Cr powder with a weight ratio of Mo powder, Ni powder and Cr powder being 1:1:1~3, 5~15 parts of a mixed carbide of tungsten carbide and silicon carbide with a weight ratio of tungsten carbide to silicon carbide being 2~4:1 are placed in a ball mill tank for grinding with a grinding medium as pure ethanol for wet grinding of 70~80 h, and then 5~25 parts of $ZnFe_2O_4$ nano-particle are added to continue grinding for 8~14 h to obtain a slurry which is placed in a drying oven for drying, and then placed in a high temperature sintering furnace for sintering with a sintering curve as follows: heating from room temperature to 400~500° C. at the heating rate of 1~2° C./min, holding for 0.5~1 h, and then heating to 1150~1250° C. at the heating rate of 2~3° C./min, holding for 1~2 h, and finally, heating to 1350~1450° C. at the heating rate of 3~5° C./min, holding for 10~30 min, cooling down to room temperature to obtain the high-strength wear-resistant material.

In some examples, a preparation method of a screw pump screw rod rubber lining mould includes the following steps:
- 50~90 weight parts of high strength wear-resistant material and 6~15 weight parts of binder are mixed to obtain a mixed slurry;
- the above mixed slurry is injected into a female die for solidification and then taken out to form a screw rod rubber lining mould preform;
- the screw rod rubber lining mould preform is placed in a drying oven of 60~70° C. and dried for 1~3 h, and then placed in a high temperature furnace for sintering with a sintering curve as follows: heating from room temperature to 450~550° C. at the heating rate of 0.5~2.5° C./min, holding for 1~2 h, and then heating to 1150~1300° C. at the heating rate of 3~5° C./min to obtain a screw rod rubber lining mould;
- the above screw rod rubber lining mould is immersed in an aluminum borosilicate whisker/polyimide composite material solution with a mass fraction of 15~30 wt % for 10~20 min, and then placed in a drying oven of 100~15° C. for heat treatment with treatment time of 30~50 min to form a wear-resistant layer of 6~12 μm thick, and then taken out and cooled down to obtain a final mould.

More preferably, a preparation method of the above aluminum borosilicate whisker/polyimide composite material:

based on weight part, 2.5 parts of aluminum borosilicate whisker is added to 50 parts of a polyimide solution dispersed ultrasonically with ethanol for reaction of 1 h at the temperature of 125° C., and placed in a drying oven for drying of 8 h after the reaction, and then cooled down to obtain the aluminum borosilicate whisker/polyimide composite material.

Example 1

A preparation method a high strength wear-resistant material is as follows:

Based on weight part, 35 parts of Ti(C,N), 15 parts of a mixed powder of Mo powder, Ni powder and Cr powder with a weight ratio of Mo powder, Ni powder and Cr powder being 1:1:2, 11 parts of a mixed carbide of tungsten carbide and silicon carbide with a weight ratio of tungsten carbide to silicon carbide being 2:1 were placed in a ball mill tank for grinding with a grinding medium as pure ethanol for wet grinding of 80 h, and then 20 parts of $ZnFe_2O_4$ nano-particle were added to continue grinding for 14 h to obtain a slurry which was placed in a drying oven for drying, and then placed in a high temperature sintering furnace for sintering with a sintering curve as follows: heating from room temperature to 500° C. at the heating rate of 2° C./min, holding for 1 h, and then heating to 1150° C. at the heating rate of 3° C./min, holding for 2 h, and finally, heating to 1350° C. at the heating rate of 5° C./min, holding for 15 min, cooling down to room temperature to obtain the high-strength wear-resistant material.

Example 2

A preparation method a high strength wear-resistant material is as follows:

Based on weight part, 25 parts of Ti(C,N), 12 parts of a mixed powder of Mo powder, Ni powder and Cr powder with a weight ratio of Mo powder, Ni powder and Cr powder being 1:1:1, 9 parts of a mixed carbide of tungsten carbide and silicon carbide with a weight ratio of tungsten carbide to silicon carbide being 3:1 were placed in a ball mill tank for grinding with a grinding medium as pure ethanol for wet grinding of 72 h, and then 15 parts of $ZnFe_2O_4$ nano-particle were added to continue grinding for 12 h to obtain a slurry which was placed in a drying oven for drying, and then placed in a high temperature sintering furnace for sintering with a sintering curve as follows: heating from room temperature to 450° C. at the heating rate of 1.5° C./min, holding for 0.5 h, and then heating to 1200° C. at the heating rate of 2.5° C./min, holding for 1 h, and finally, heating to 1400° C. at the heating rate of 5° C./min, holding for 10 min, cooling down to room temperature to obtain the high-strength wear-resistant material.

Example 3

A preparation method of a screw pump screw rod rubber lining mould includes the following steps:
- 70 weight parts of high strength wear-resistant material of example 1 and 8 weight parts of urea resin were mixed to obtain a mixed slurry;
- the above mixed slurry was injected into a female die for solidification and then taken out to form a screw rod rubber lining mould preform;
- the screw rod rubber lining mould preform was placed in a drying oven of 65° C. and dried for 2 h, and then placed in a high temperature furnace for sintering with a sintering curve as follows: heating from room temperature to 500° C. at the heating rate of 1° C./min, holding for 1 h, and then heating to 1250° C. at the heating rate of 4° C./min to obtain a screw rod rubber lining mould;
- the above screw rod rubber lining mould was immersed in an aluminum borosilicate whisker/polyimide composite material solution with a mass fraction of 25 wt % for 10 min, and then placed in a drying oven of 100° C. for heat treatment with treatment time of 35 min to form a wear-resistant layer of 8 μm thick, and then taken out and cooled down to obtain a final mould.

Example 4

A preparation method of a screw pump screw rod rubber lining mould includes the following steps:
- 65 weight parts of high strength wear-resistant material of example 2 and 10 weight parts of urea resin were mixed to obtain a mixed slurry;
- the above mixed slurry was injected into a female die for solidification and then taken out to form a screw rod rubber lining mould preform;
- the screw rod rubber lining mould preform was placed in a drying oven of 70° C. and dried for 3 h, and then placed in a high temperature furnace for sintering with a sintering curve as follows: heating from room temperature to 550° C. at the heating rate of 2.5° C./min, holding for 2 h, and then heating to 1300° C. at the heating rate of 5° C./min to obtain a screw rod rubber lining mould;
- the above screw rod rubber lining mould was immersed in an aluminum borosilicate whisker/polyimide composite material solution with a mass fraction of 15 wt % for 15 min, and then placed in a drying oven of 125° C. for heat treatment with treatment time of 40 min to form a wear-resistant layer of 6 μm thick, and then taken out and cooled down to obtain a final mould.

Example 5

A preparation method of a screw pump screw rod rubber lining mould is identical to example 4 except for the followings:

the above screw rod rubber lining mould was immersed in a composite solution of an aluminum borosilicate whisker/polyimide composite material and sodium tripolyphosphate with a mass fraction of 15 wt % for 15 min, where a mass ratio of the aluminum borosilicate whisker/polyimide composite material to sodium tripolyphosphate was 4:1; and then placed in a drying oven of 125° C. for heat treatment with treatment time of 40 min to form a wear-resistant layer of 6 μm thick, and then taken out and cooled down to obtain a final mould.

Example 6

Figure 11:
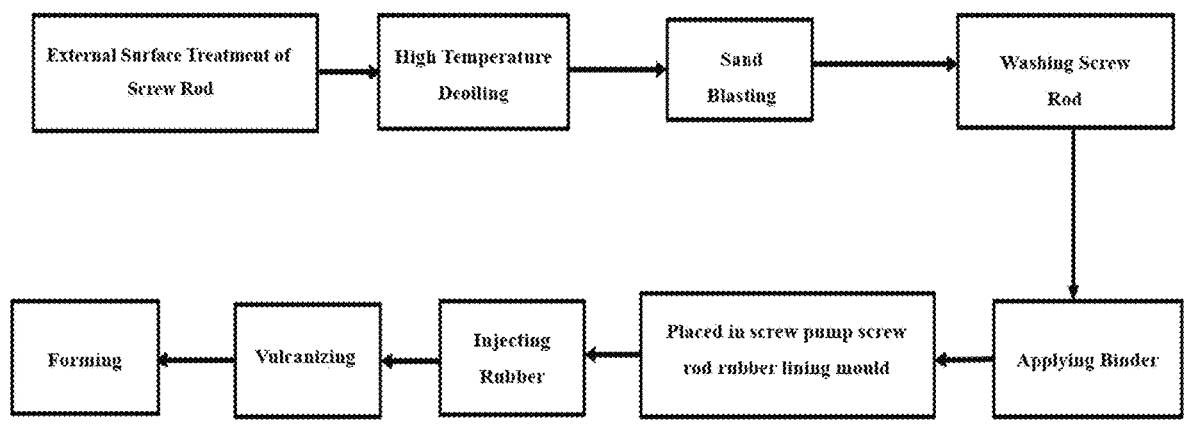
FIG. 11 is a flowchart of a method of using a screw pump screw rod rubber lining mould.

A use method of a screw pump screw rod rubber lining mould is provided with its flow shown in FIG. 11, including performing external surface treatment, high temperature deoiling, sand blasting, and washing for a screw rod and applying binder; then, placing the screw rod in the above screw pump screw rod rubber lining mould, injecting rubber, and vulcanizing to obtain a screw pump screw rod rubber lining; where the specific experimental conditions are prior art and operation is performed according to normal conditions.

Control Example 1

A preparation method of a high strength wear-resistant material differs from example 2 in that $ZnFe_2O_4$ nano-particle was not added to the material ingredients.

Control Example 2

A preparation method of a high strength wear-resistant material differs from example 2 in that $ZnFe_2O_4$ nano-particle in the material ingredients was replaced with boron nitride powder.

Control Example 3

A preparation method of a screw pump screw rod rubber lining mould was identical to example 3 except that the prepared screw pump screw rod rubber lining mould was not subjected to surface heat treatment.

Control Example 4

A preparation method of a screw pump screw rod rubber lining mould was identical to example 4 except that the prepared screw pump screw rod rubber lining mould was not subjected to surface heat treatment.

Experimental Example 1

1. XRD Determination of a High Strength Wear-Resistant Material

It is obtained by performing test with a D/max-2400 type X-ray diffractometer manufactured by Japanese Rigaku Corporation. Cu Kα target is used as a radiation source with λ=0.15418 nm, voltage 30 kV, scanning range 10-80° and scanning rate 5°/min.

FIG. 1 is an XRD diagram of a high-strength wear-resistant material of example 2. It can be seen from FIG. 1 that crystalline phase diffraction peak appearing in the high-strength wear-resistant material corresponds to a $ZnFe_2O_4$ crystal structure standard card (JCPDS No. 22~1012), presented as face-centered cubic crystalline phase and having good crystallinity and purity; crystalline phase diffraction peak of (Ti, W, Mo)(C,N) and (W, Ti)(Ni, Co, Mo) also appears in the XRD diagram. The reason may be that in a high temperature treatment process, the material Ti(C,N) is solid-dissolved in the metal binder phase Mo powder and Ni powder and tungsten carbide to different extents; it can be seen that the $ZnFe_2O_4$ nano-particle reinforced Ti(C,N)-based metal ceramic high strength wear-resistant material is obtained in the example 2.

2. Determination of a Bending Strength of a High-Strength Wear-Resistant Material A bending strength of a cuboid specimen of 20 mm×6.3 mm×5.5 mm is determined using a three-point bending method. When determination is performed on a material tester, the specimen is clamped between two supporting points of a fixture, and a concentrated load is applied to one point until the specimen breaks. Each specimen group included six specimens and a mean value is obtained from the measurement results.

$$\sigma 3b = 3PL/2BH^2$$

In the formula:
 σ3b—bending strength, N/mm²;
 P—maximum externally-applied load during test, N;
 L—distance between two points, i.e. a span distance of the fixture, mm;
 B—specimen width, with unit of mm;
 H—specimen thickness with unit of mm.

Figure 2:
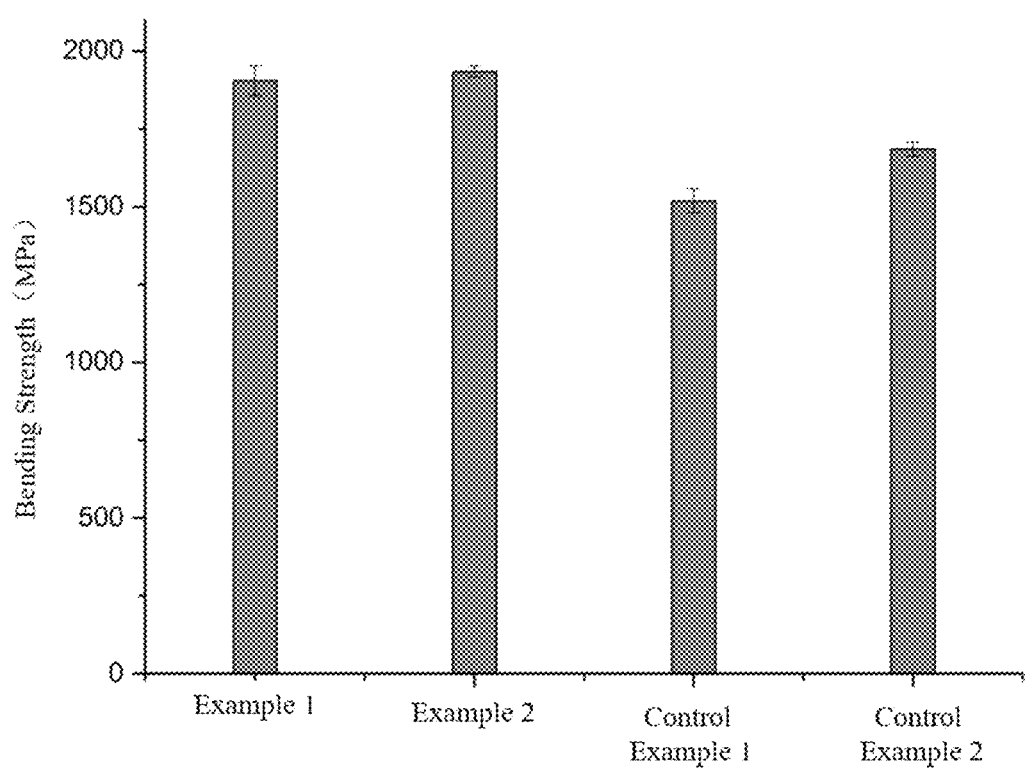
FIG. 2 is a bending strength of a high-strength wear-resistant material.

FIG. 2 shows a bending strength of a high strength wear-resistant material. It can be seen from the FIG. 2 that the bending strengths of the high strength wear-resistant materials of examples 1 and 2 are higher than 1900 MPa, and the comparison of the example 2 and the control examples 1 and 2 shows that the bending strength of the high-strength wear-resistant material of example 2 is higher than control examples 1 and 2. It is indicated that addition of $ZnFe_2O_4$ nano-particle to the Ti(C,N)-based metal ceramic composite material improves the bending strength of the Ti(C,N)-based metal ceramic composite material for the following reason: the $ZnFe_2O_4$ nano-particle enable the Ti(C,N)-based metal ceramic to be refined, the physicochemical properties of the Ti(C,N)-based metal ceramic composite material are regulated and the bending strength of the material is improved.

3. Determination of a Hardness of a High Strength Wear-Resistant Material

In this experiment, the hardness HRA is measured by a HRS-150 digital display Rockwell hardness tester. The initial test force is 98.0N, the total test force is 588.4N, the indenter specification is 3 and 120° diamond pyramid, and the pressure retention time of the total test force is 10 s. The formula is as follows:

$$HRA = 100 - e/0.002$$

Figure 3:
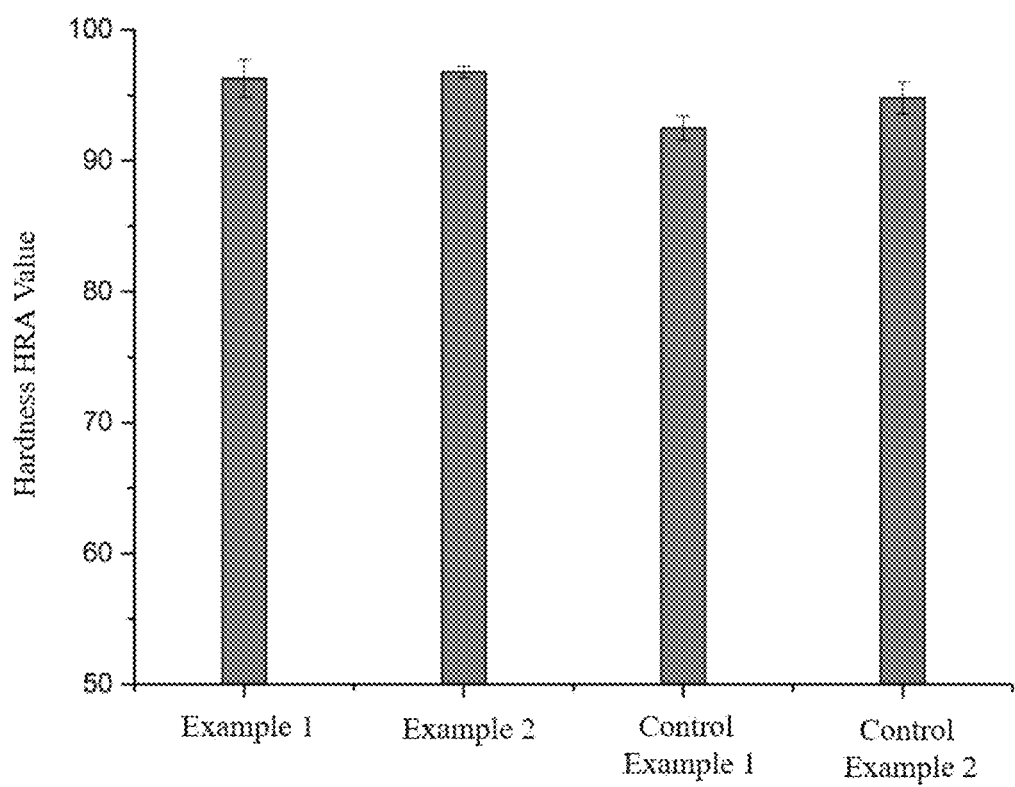
FIG. 3 is a hardness HRA value of a high-strength wear-resistant material.

FIG. 3 is a hardness HRA value of a high strength wear-resistant material. It can be seen from FIG. 3 that the hardness HRA values of the high strength wear-resistant materials of examples 1 and 2 are higher than 96, and the comparison of the example 2 and the control examples 1 and 2 shows that the hardness HRA value of the high-strength wear-resistant material of example 2 is higher than control examples 1 and 2. It is indicated that addition of $ZnFe_2O_4$ nano-particle to the Ti(C,N)-based metal ceramic composite material improves the hardness of the Ti(C,N)-based metal ceramic composite material for the following reason: the $ZnFe_2O_4$ nano-particle enables the Ti(C,N)-based metal ceramic to be refined, the physicochemical properties of the Ti(C,N)-based metal ceramic composite material are regulated and the hardness of the material is improved.

4. Determination of a Fracture Toughness of a High Strength Wear-Resistant Material In this experiment, the facture toughness $K_{IC}$ is measured by indentation method. A polished specimen surface is pressed in by use of a Vickers indenter on the HX-1000 microscopic hardness tester. Four cracks occur along an extension direction of the indentation diagonal line, a length of the cracks is measured, and then the $K_{IC}$ value is obtained according to the relationship of load and crack length. According to the test force (F), the crack length (d) generated at the indentation diagonal line and Vickers hardness (HV) value, the facture toughness $K_{IC}$ is obtained by use of the following formula.

$$K_{IC}=0.016(E/H)^{1/2}Fd^{-3/2}$$

In the formula:
E—Elastic modulus of material
H—Vickers hardness value

In this experiment, the HX-1000 microscopic hardness tester is used to measure Vickers hardness value in the following formula:

$$H=0.1891F/d^2$$

In the formula:
F—test force;
d—indentation diagonal line length, mm;

The level of the test force is 2.942N and the test force retention time is 30 s.

Figure 4:
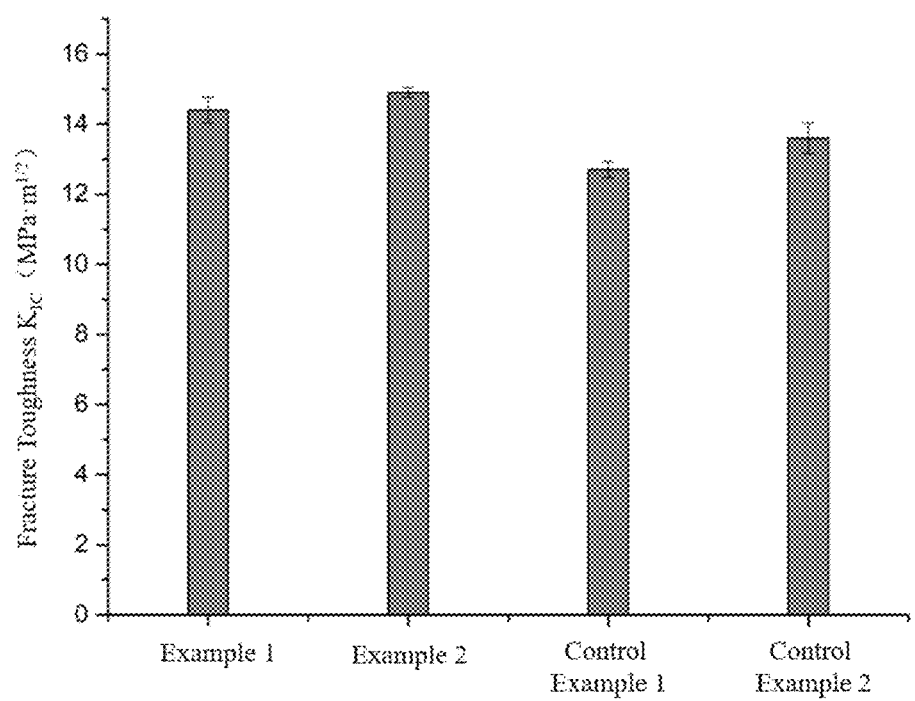
FIG. 4 is a fracture toughness of a high-strength wear-resistant material.

FIG. 4 shows a fracture toughness of a high strength wear-resistant material. It can be seen from FIG. 4 that the fracture toughnesses of the high strength wear-resistant materials of the examples 1 and 2 are higher than 14 MPa·m$^{1/2}$, and the comparison of the example 2 and the control examples 1 and 2 shows that the fracture toughness of the high-strength wear-resistant material of example 2 is higher than control examples 1 and 2. It is indicated that addition of $ZnFe_2O_4$ nano-particle to the Ti(C,N)-based metal ceramic composite material improves the fracture toughness of the Ti(C,N)-based metal ceramic composite material to some extent for the following reason: the $ZnFe_2O_4$ nano-particle enables the Ti(C,N)-based metal ceramic to be refined, the physicochemical properties of the Ti(C,N)-based metal ceramic composite material are regulated and the fracture toughness of the material is improved.

5. Determination of a Wear-Resistance of a High Strength Wear-Resistant Material In the experiment, the wear resistance is evaluated by use of a wear loss of unit area of the specimen. The material specimen is made into a size of 5 cm×5 cm, a weight of the specimen is weighed by a precision balance prior to the wear test, and then the specimen is placed into a wear test device to perform the wear test, and then the weight of the worn specimen is weighed by use of an electronic precision balance, and then the wear amount per unit area is obtained by dividing a difference of the weights after and before the wear test by a surface area of the specimen, and finally the wear resistance is determined according to the wear amount of the specimen. In this experiment, the wear test is performed for the specimen at an impact angle of 30° for 60 min so as to study the wear resistance of the mould.

Figure 5:
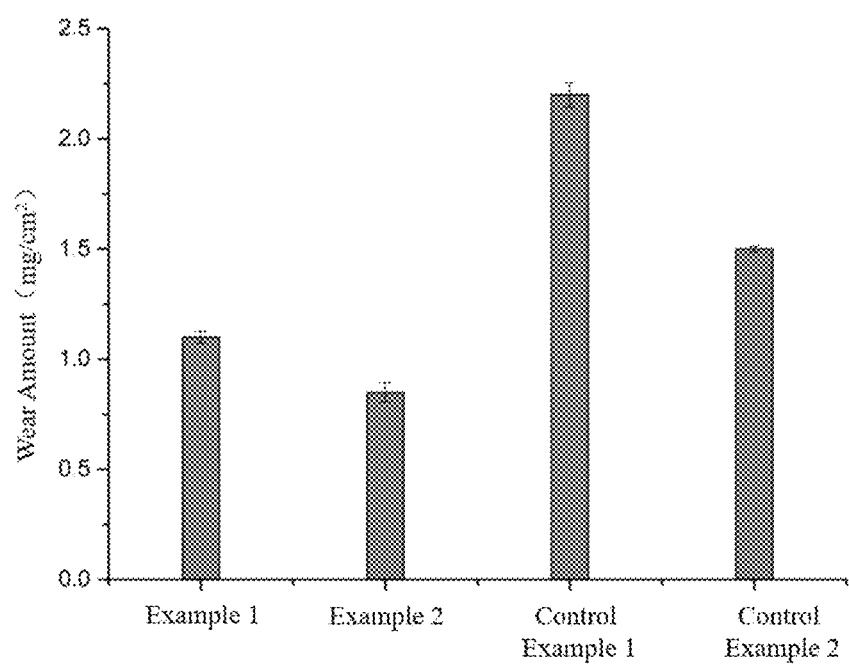
FIG. 5 is a wear amount of a high-strength wear-resistant material.

FIG. 5 shows a wear amount of a high strength wear-resistant material. It can be seen from FIG. 5 that the wear amounts of the high strength wear-resistant materials of the examples 1 and 2 are higher than 1.1 mg/cm$^2$, and the comparison of the example 2 and the control examples 1 and 2 shows that the wear amount of the high-strength wear-resistant material of example 2 is lower than control examples 1 and 2. It is indicated that addition of $ZnFe_2O_4$ nano-particle to the material reduces the wear amount of the Ti(C,N)-based metal ceramic composite material to some extent for the following reason: the $ZnFe_2O_4$ ceramic nano-particle reinforcement combines with the metal ceramic matrix, so that the ingredients of the material achieve synergic effect in a high temperature treatment, thereby increasing the wear resistance of the material.

6. Determination of a Bending Strength of a Screw Pump Screw Rod Rubber Lining Mould In this experiment, the mould is cut into a cuboid of 20 mm×6.3 mm×5.5 mm for test of the bending strength. The specific test conditions are identical to the test conditions of "2. Determination of a bending strength of a high strength wear-resistant material".

Figure 6:
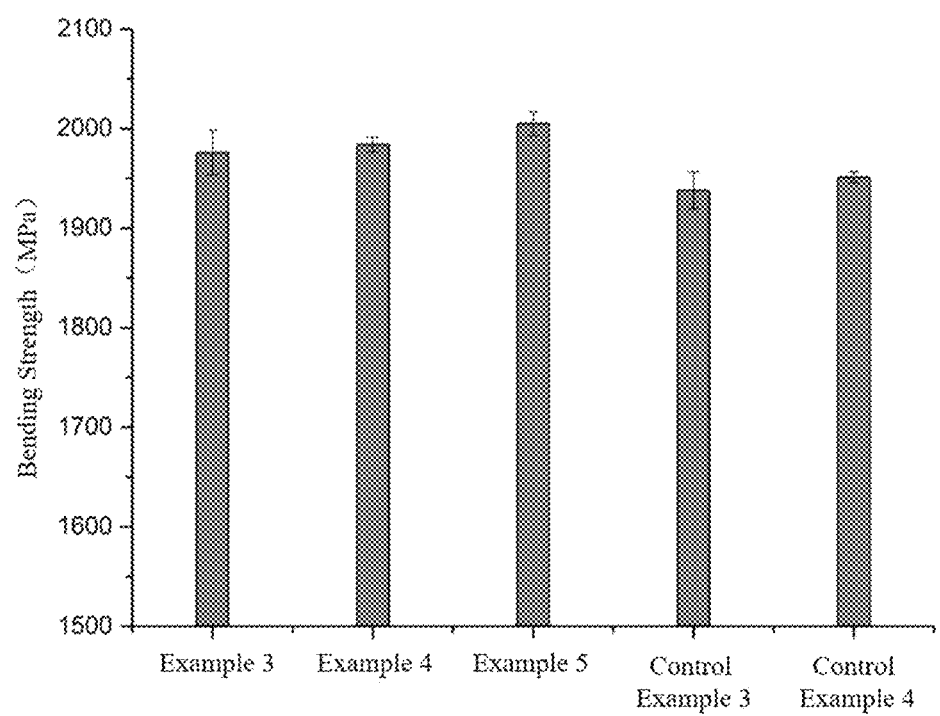
FIG. 6 is a bending strength of a screw pump screw rod rubber lining mould.

FIG. 6 shows a bending strength of a screw pump screw rod rubber lining mould. It can be seen from FIG. 6 that the bending strengths of the screw pump screw rod rubber lining moulds of examples 3, 4 and 5 are higher than 1975 MPa, and the comparison of the example 4 and the example 5 shows that the bending strength of the screw pump screw rod rubber lining mould of example 5 is higher than the example 4, which indicates that the immersion of the mould in the composite solution of the aluminum borosilicate whisker/polyimide composite material and sodium tripolyphosphate further reduces the bending strength of the mould; the comparison of the example 3 and the control example 3, and the example 4 and the control example 4 shows that the bending strengths of the screw pump screw rod rubber lining moulds of the examples 3 and 4 are higher than the control examples 3 and 4, which indicates that the immersion of the mould in the aluminum borosilicate whisker/polyimide composite material solution for surface heat treatment improves the bending strength of the mould.

7. Determination of a Hardness of a Screw Pump Screw Rod Rubber Lining Mould

In this experiment, the mould is made into a test specimen size, and reference may be made to "3. Determination of a hardness of a high strength wear-resistant material" for the test conditions for the hardness of the mould.

Figure 7:
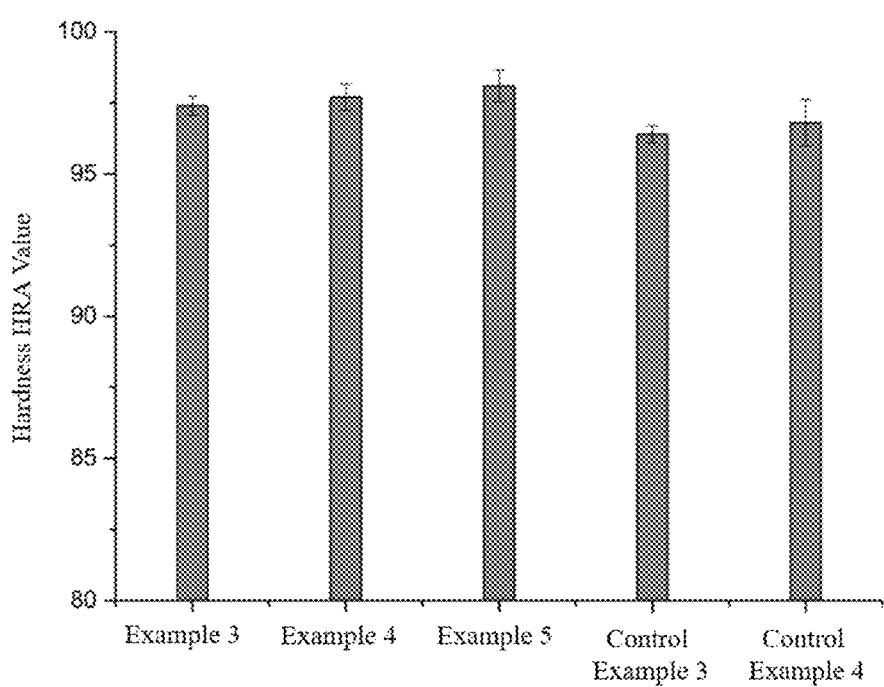
FIG. 7 is a hardness HRA value of a screw pump screw rod rubber lining mould.

FIG. 7 shows a hardness HRA value of a screw pump screw rod rubber lining mould. It can be seen that the hardness HAR values of the screw pump screw rod rubber lining moulds of examples 3, 4, and 5 are higher than 96.5, and the comparison of example 4 and example 5 shows that the hardness HAR value of the screw pump screw rod rubber lining mould of examples 5 is higher than the example 4, which indicates that the immersion of the mould in the composite solution of the aluminum borosilicate whisker/polyimide composite material and sodium tripolyphosphate further reduces the hardness of the mould; the comparison of the example 3 and the control example 3, and the example 4 and the control example 4 shows that the hardness HRA values of the screw pump screw rod rubber lining moulds of the examples 3 and 4 are higher than the control examples 3 and 4, which indicates that the immersion of the mould in the aluminum borosilicate whisker/polyimide composite material solution for surface heat treatment improves the hardness of the mould so that the mould has a better hardness.

8. Determination of a Wear Resistance of a Screw Pump Screw Rod Rubber Lining Mould The mould is made into a size of 5 cm×5 cm and reference may be made to "5. Determination of a wear resistance of a high strength wear-resistant material" for test of the wear resistance of the mould.

Figure 8:
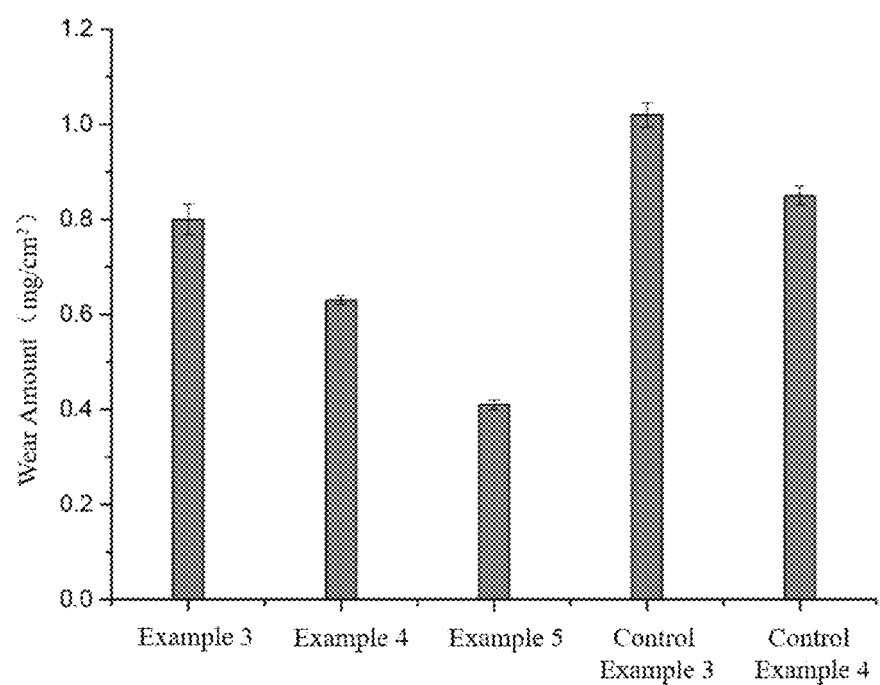
FIG. 8 is a wear amount of a screw pump screw rod rubber lining mould.

FIG. 8 shows a wear amount of a screw pump screw rod rubber lining mould. It can be seen from FIG. 8 that the wear amounts of the screw pump screw rod rubber lining moulds of examples 3 and 4 are lower than 0.9 mg/cm$^2$, the wear amount of the screw pump screw rod rubber lining mould of example 5 is lower than 0.5 mg/cm$^2$, and the comparison of the examples 4 and 5 shows that the wear amount of the screw pump screw rod rubber lining mould of example 5 is lower than example 4, which indicates that the immersion of the mould in the composite solution of the aluminum borosilicate whisker/polyimide composite material and sodium tripolyphosphate further reduces the wear amount of the mould; the comparison of the example 3 and the control example 3, and the example 4 and the control example 4 shows that the wear amounts of the screw pump screw rod rubber lining moulds of the examples 3 and 4 are lower than the control examples 3 and 4 respectively, which indicates that the immersion of the mould in the aluminum borosilicate whisker/polyimide composite material solution for surface heat treatment reduces the wear amount of the mould so that the mould has a better wear resistance. The reason may be that the aluminum borosilicate whisker/polyimide composite material performs composite reaction with other ingredients in the mould to form a wear-resistant protective layer on the surface of the mould, achieving the wear resistance.

9. Determination of a High Temperature Oxidation Resistance of a Screw Pump Screw Rod Rubber Lining Mould The oxidation test is performed using a static air oxidation method in the following oxidation test process: heating a muffle furnace to an oxidation test temperature of 500° C., and then placing the material in the muffle furnace for oxidation of 12 h and then taking out, where a mass retention rate is used to characterize the oxidation resistance of the material, and the mass retention rate of the material is defined as a ratio of masses of the material before and after oxidation. If the mass of the material before oxidation test is $m_0$ and the mass after oxidation test is $m_1$, the mass retention rate of the material is $m_R$:

$$m_R = m_1/m_0 \times 100\%$$

Figure 9:
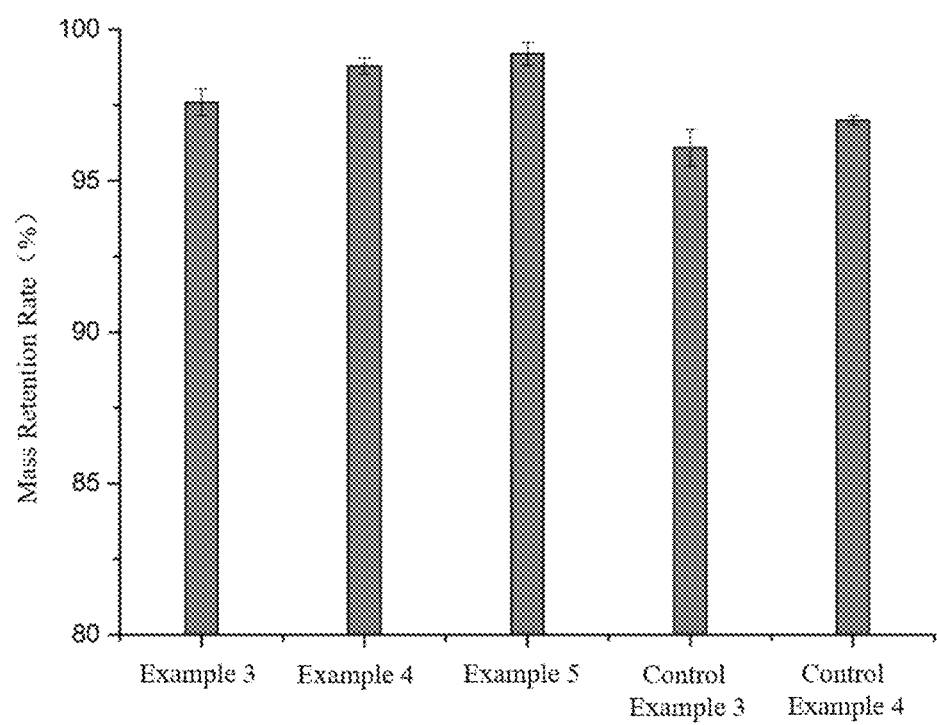
FIG. 9 is a mass retention rate of a screw pump screw rod rubber lining mould.

FIG. 9 shows a mass retention rate of a screw pump screw rod rubber lining mould. It can be seen from FIG. 9 that the mass retention rates of the screw pump screw rod rubber lining moulds of examples 3 and 4 are higher than 97.5%, the mass retention rate of the example 5 is higher than 99%, and comparison of examples 4 and 5 shows that the mass retention rate of the screw pump screw rod rubber lining mould of example 5 is higher than example 4, which indicates that the immersion of the mould in the composite solution of the aluminum borosilicate whisker/polyimide composite material and sodium tripolyphosphate further reduces the high temperature oxidation resistance of the mould; comparison of example 3 and control example 3, and example 4 and control example 4 shows that the mass retention rates of the screw pump screw rod rubber lining moulds of examples 3 and 4 are higher than control examples 3 and 4 respectively, which indicates that the immersion of the mould in the aluminum borosilicate whisker/polyimide composite material solution for surface heat treatment improves the high temperature oxidation resistance of the mould for the following reason: the aluminum borosilicate whisker/polyimide composite material performs composite reaction with other ingredients in the mould to form a wear-resistant protective layer on the surface of the mould, further increasing the high temperature oxidation resistance of the mould.

10. Determination of a Corrosion Resistance of a Screw Pump Screw Rod Rubber Lining Mould In the experiment, the corrosion resistance of the mould is determined using salt spray. The specimen is made into a size of 20×φ12 mm. The test is performed using a salt spray test chamber (cc×2000 type corrosion chamber) to perform spray corrosion in an artificial environment. Before test, 5 wt % NaCl solution is introduced into a test chamber and works with an automatic circulation instrument. A compressor is opened and the specimen is placed on a triangular support strip of a polyvinyl chloride test rod of different diameters, and then covered with the layer of the test chamber for 48 h corrosion, and then the corrosion rate of the corroded specimen is calculated in the following formula:

$$\text{Corrosion rate} = (W_0 - W_1)/S \cdot t$$

in the formula,
W0—mass before corrosion of specimen(g);
W1—mass after corrosion of specimen(g);
S—total area of specimen (m2);
t-corrosion time of specimen (h).

Figure 10:
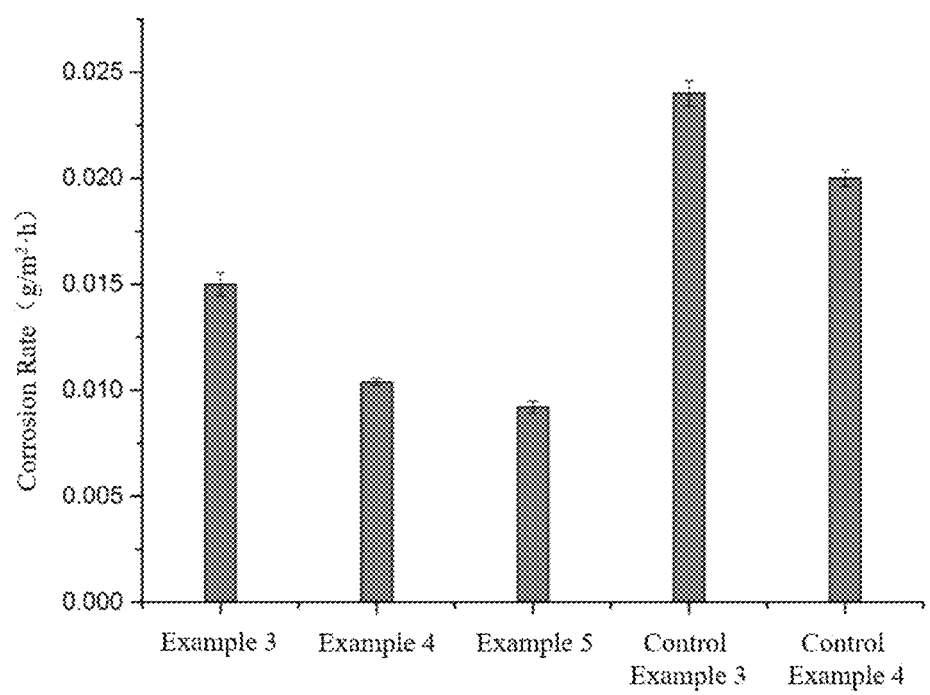
FIG. 10 is a corrosion rate of a screw pump screw rod rubber lining mould.

FIG. 10 shows a corrosion rate of a screw pump screw rod rubber lining mould. It can be seen from FIG. 10 that the corrosion rates of the screw pump screw rod rubber lining moulds of examples 3 and 4 are not higher than 0.015 g/m$^2$·h, the corrosion rate of the screw pump screw rod rubber lining moulds of example 5 is lower than 0.0095 g/m$^2$·h, and the comparison of examples 4 and 5 shows that the corrosion rate of the screw pump screw rod rubber lining moulds of example 5 is lower than example 4, which indicates that the immersion of the mould in the composite solution of the aluminum borosilicate whisker/polyimide composite material and sodium tripolyphosphate further reduces the corrosion resistance of the mould; comparison of example 3 and control example 3, and example 4 and control example 4 shows that the corrosion rates of the screw pump screw rod rubber lining moulds of examples 3 and 4 are lower than control examples 3 and 4 respectively, which indicates that the immersion of the mould in the aluminum borosilicate whisker/polyimide composite material solution for surface heat treatment improves the corrosion resistance of the mould for the following reason: the aluminum borosilicate whisker/polyimide composite material performs composite reaction with other ingredients in the mould to form a wear-resistant protective layer on the surface of the mould, further increasing the corrosion resistance of the mould.

The normal operations involved in the operation steps of the present disclosure are well known to persons skilled in the art and will not be repeated herein.

The above examples are only used to describe the present disclosure rather than limit the present disclosure. Those skilled in the art may make various changes or variations to the present disclosure without departing from the spirit and scope of the present disclosure. Therefore, all equivalent technical solutions also belong to the scope of the present disclosure, and the scope of protection of the present disclosure is defined by the claims.

What is claimed is:

1. A preparation method of a screw pump screw rod rubber lining mould, wherein the screw pump screw rod rubber lining mould is made of a high strength wear-resistant material prepared by $ZnFe_2O_4$ nano-particle reinforced Ti(C,N)-based using metal ceramic composite material, and the preparation method of the screw pump screw rod rubber lining mould comprises the following steps:
- mixing the high strength wear-resistant material with a binder to obtain a mixed slurry;
- injecting the mixed slurry into a female die for solidification and taking out to form a screw rod rubber lining mould preform;
- drying and sintering the screw rod rubber lining mould preform to obtain a screw rod rubber lining mould; and immersing the screw rod rubber lining mould into a surface treatment liquid for surface heat treatment to form a wear-resistant layer, and cooling down to obtain a final mould.

2. The preparation method according to claim 1, wherein based on weight part, the high strength wear-resistant material is 50~90 parts, and the binder is 6~15 parts.

3. The preparation method according to claim 1, wherein the surface treatment liquid comprises an aluminum borosilicate whisker/polyimide composite material solution.

* * * * *